United States Patent
Baumgart et al.

(10) Patent No.: US 7,479,308 B2
(45) Date of Patent: Jan. 20, 2009

(54) PROCESS FOR PRODUCING MULTICOAT COLOR AND/OR EFFECT PAINT SYSTEMS CURABLE THERMALLY AND WITH ACTINIC RADIATION

(75) Inventors: Hubert Baumgart, Münster (DE); Daniel Kussel, Münster (DE); Yvonne Lichte, Münster (DE)

(73) Assignee: BASF Coatings AG, Munster (DE)

( * ) Notice: Subject to any disclaimer, the term of this patent is extended or adjusted under 35 U.S.C. 154(b) by 930 days.

(21) Appl. No.: 10/500,741

(22) PCT Filed: Jan. 31, 2003

(86) PCT No.: PCT/EP03/00967

§ 371 (c)(1),
(2), (4) Date: Jul. 1, 2004

(87) PCT Pub. No.: WO03/068417

PCT Pub. Date: Aug. 21, 2003

(65) Prior Publication Data

US 2005/0079293 A1    Apr. 14, 2005

(30) Foreign Application Priority Data

Feb. 15, 2002 (DE) .............................. 102 06 225

(51) Int. Cl.
*B05D 3/02* (2006.01)
*B05D 3/06* (2006.01)

(52) U.S. Cl. .................. 427/508; 427/514; 427/553; 427/407.1

(58) Field of Classification Search .................. None
See application file for complete search history.

(56) References Cited

U.S. PATENT DOCUMENTS

| | | |
|---|---|---|
| 4,013,806 A | 3/1977 | Volkert et al. |
| 4,025,407 A | 5/1977 | Chang et al. |
| 4,128,600 A | 12/1978 | Skinner et al. |
| 4,139,385 A | 2/1979 | Crivello |
| 4,192,762 A | 3/1980 | Osborn et al. |
| 4,212,901 A | 7/1980 | Van Neerbos et al. |
| 4,229,679 A | 10/1980 | Lode |
| 4,247,578 A | 1/1981 | Skinner et al. |
| 4,268,542 A | 5/1981 | Sakakibara et al. |
| 4,287,116 A | 9/1981 | Burns |
| 4,342,793 A | 8/1982 | Skinner et al. |
| 4,377,457 A | 3/1983 | Boeckeler et al. |
| 4,415,604 A | 11/1983 | Nativi |
| 4,424,252 A | 1/1984 | Nativi |
| 4,444,954 A | 4/1984 | Mels et al. |
| 4,481,093 A | 11/1984 | Murphy et al. |
| 4,489,135 A | 12/1984 | Drexler et al. |
| 4,514,460 A | 4/1985 | Johnson |
| 4,526,939 A | 7/1985 | Lewarchik et al. |
| 4,532,021 A | 7/1985 | Murphy et al. |
| 4,558,090 A | 12/1985 | Drexler et al. |
| 4,607,084 A | 8/1986 | Morris |
| 4,618,632 A | 10/1986 | Su |
| 4,634,602 A | 1/1987 | Sirkoch et al. |
| 4,675,234 A | 6/1987 | Sachs et al. |
| 4,710,542 A | 12/1987 | Forgione et al. |
| 4,746,366 A | 5/1988 | Philipp et al. |
| 4,761,435 A | 8/1988 | Murphy et al. |
| 4,786,657 A | 11/1988 | Hammar et al. |
| 4,791,168 A | 12/1988 | Salatin et al. |
| 4,794,147 A | 12/1988 | Savino et al. |
| 4,851,460 A | 7/1989 | Stranghöner et al. |
| 4,880,867 A | 11/1989 | Gobel et al. |
| 4,939,213 A | 7/1990 | Jacobs, III et al. |
| 4,945,128 A | 7/1990 | Hille et al. |
| 4,952,612 A | 8/1990 | Brown-Wensley et al. |
| 4,978,708 A | 12/1990 | Fowler et al. |
| 4,985,340 A | 1/1991 | Palazzotto et al. |
| 5,013,631 A | 5/1991 | Su |

(Continued)

FOREIGN PATENT DOCUMENTS

| | | |
|---|---|---|
| CA | 2073115 | 7/1992 |
| CA | 2079498 | 9/1992 |
| CA | 2153581 | 1/1994 |
| CA | 2102169 | 5/1994 |
| CA | 2102170 | 5/1994 |

(Continued)

OTHER PUBLICATIONS

English Language Abstract for DE3828098 from EPO, Mar. 4, 1990.
English Language Abstract for DE4011045 from EPO, Oct. 9, 1991.
English Language Abstract for DE4020316 from EPO, Jan. 9, 1992.
English Language Abstract for DE4025215 from EPO, Feb. 19, 1992.
English Language Abstract for DE4303570 from EPO, Aug. 11, 1994.

(Continued)

*Primary Examiner*—William Phillip Fletcher, III

(57) ABSTRACT

A process for producing multicoat paint systems by
(I) applying a dual-cure primer (A) curable thermally and with actinic radiation to a substrate to give a primer film (A),
(II) exposing the primer film (A) to actinic radiation to give a partially cured primer film (A),
(III) applying a pigmented coating material (B) curable thermally and/or a pigmented dual-cure coating material (B) to the partially cured primer film (A) to give at least one pigmented film (B),
(IV) exposing the dual-cure film (B) to actinic radiation to give a partially cured film (B),
(V) applying a clearcoat material (C) curable with actinic radiation and/or a dual-cure clearcoat material (C) to the film (B) to give a clearcoat and/or a dual-cure clearcoat film (C),
(VI) exposing the clearcoat film(s) (C) to actinic radiation to give a dual-cure clearcoat (C) and/or a partially cured clearcoat film (C), and
(VII) subjecting the films (A), (B), and (C) to joint thermal curing when still only partially cured.

20 Claims, No Drawings

U.S. PATENT DOCUMENTS

| | | |
|---|---|---|
| 5,075,372 A | 12/1991 | Hille et al. |
| 5,084,541 A | 1/1992 | Jacobs, III et al. |
| 5,089,376 A | 2/1992 | Setthachayanon |
| 5,153,101 A | 10/1992 | Meier et al. |
| 5,169,719 A | 12/1992 | Balatan |
| 5,234,970 A | 8/1993 | Kyle |
| 5,236,995 A | 8/1993 | Salatin et al. |
| 5,300,328 A | 4/1994 | Rehfuss |
| 5,326,621 A | 7/1994 | Palazzotto et al. |
| 5,334,420 A | 8/1994 | Hartung et al. |
| 5,342,882 A | 8/1994 | Göbel et al. |
| 5,356,669 A | 10/1994 | Rehfuss et al. |
| 5,368,944 A | 11/1994 | Hartung et al. |
| 5,370,910 A | 12/1994 | Hill et al. |
| 5,409,740 A | 4/1995 | Brann |
| 5,416,136 A | 5/1995 | Konzmann et al. |
| 5,418,264 A | 5/1995 | Obloh et al. |
| 5,418,301 A | 5/1995 | Hult et al. |
| 5,425,970 A | 6/1995 | Lahrmann et al. |
| 5,453,451 A | 9/1995 | Sokol |
| 5,462,797 A | 10/1995 | Williams et al. |
| 5,474,811 A | 12/1995 | Rehfuss et al. |
| 5,512,322 A | 4/1996 | Hille et al. |
| 5,552,496 A | 9/1996 | Vogt-Birnbrich et al. |
| 5,569,705 A | 10/1996 | Vogt-Birnbrich et al. |
| 5,571,861 A | 11/1996 | Klein et al. |
| 5,580,614 A | 12/1996 | Amberg-Schwab et al. |
| 5,601,878 A | 2/1997 | Kranig et al. |
| 5,601,880 A | 2/1997 | Schwarte et al. |
| 5,605,965 A | 2/1997 | Rehfuss et al. |
| 5,610,224 A | 3/1997 | DePue et al. |
| 5,623,016 A | 4/1997 | Klein et al. |
| 5,626,958 A | 5/1997 | D'Herbecourt et al. |
| 5,654,391 A | 8/1997 | Göbel et al. |
| 5,658,617 A | 8/1997 | Göbel et al. |
| 5,663,247 A | 9/1997 | Sörensen et al. |
| 5,686,531 A | 11/1997 | Engelke et al. |
| 5,691,419 A | 11/1997 | Engelke et al. |
| 5,691,425 A | 11/1997 | Klein et al. |
| 5,716,678 A | 2/1998 | Röckrath et al. |
| 5,728,769 A | 3/1998 | Natesh et al. |
| 5,739,194 A | 4/1998 | Natesh et al. |
| 5,922,473 A | 7/1999 | Muthiah et al. |
| 5,965,213 A | 10/1999 | Sacharski et al. |
| 6,001,424 A | 12/1999 | Lettmann et al. |
| 6,001,915 A | 12/1999 | Schwarte et al. |
| 6,017,640 A | 1/2000 | Muthiah et al. |
| 6,103,816 A | 8/2000 | Swarup et al. |
| 6,159,556 A | 12/2000 | Möller et al. |
| 6,177,535 B1 | 1/2001 | Schwalm et al. |
| 6,242,101 B1 | 6/2001 | Schealm et al. |
| 6,265,476 B1 | 7/2001 | Krongauz et al. |
| 6,332,291 B1 | 12/2001 | Flosbach et al. |
| 6,333,077 B1 | 12/2001 | Maag et al. |
| 6,335,397 B1 | 1/2002 | Kokel et al. |
| 6,344,501 B1 | 2/2002 | Sierakowski et al. |
| 6,372,875 B1 | 4/2002 | Mayer et al. |
| 6,476,121 B1 | 11/2002 | Kadambande et al. |
| 6,482,869 B1 | 11/2002 | Bolte et al. |
| 6,534,187 B2 | 3/2003 | Kron et al. |
| 6,716,891 B1 | 4/2004 | Meisenburg et al. |
| 6,727,316 B1 | 4/2004 | Bremser |
| 6,737,468 B1 | 5/2004 | Bremser |
| 2002/0156145 A1 | 10/2002 | Van Den Berg et al. |
| 2003/0023017 A1 | 1/2003 | Rink et al. |
| 2003/0077394 A1* | 4/2003 | Bradford et al. ......... 427/407.1 |
| 2003/0078315 A1 | 4/2003 | Bradford et al. |
| 2003/0078316 A1 | 4/2003 | Bradford et al. |
| 2003/0083397 A1 | 5/2003 | Bradford et al. |

FOREIGN PATENT DOCUMENTS

| | | |
|---|---|---|
| CA | 2258813 | 1/1999 |
| DE | 38 28 098 | 3/1990 |
| DE | 40 11 045 | 10/1991 |
| DE | 40 20 316 | 1/1992 |
| DE | 40 25 215 | 2/1992 |
| DE | 41 22 743 | 11/1992 |
| DE | 43 02 327 | 8/1994 |
| DE | 43 03 570 | 8/1994 |
| DE | 43 28 092 | 2/1995 |
| DE | 196 13 547 | 11/1996 |
| DE | 198 26 715 | 1/1999 |
| DE | 199 20 801 | 11/2000 |
| DE | 199 30 664 | 1/2001 |
| EP | 0 352 298 | 3/1988 |
| EP | 0 297 576 | 6/1988 |
| EP | 0 401 565 | 5/1990 |
| EP | 0 401 892 | 5/1990 |
| EP | 0 594 142 | 10/1993 |
| EP | 0 604 992 | 12/1993 |
| EP | 0 624 577 | 5/1994 |
| EP | 0 753 358 | 7/1996 |
| EP | 0 872 502 | 3/1998 |
| EP | 0 940 459 | 2/1999 |
| GB | 1 583 412 | 8/1977 |
| WO | 88/07416 | 10/1988 |
| WO | 94/10211 | 5/1994 |
| WO | 94/10213 | 5/1994 |
| WO | 98/20047 | 5/1998 |
| WO | 00/68323 | 11/2000 |
| WO | 02/074872 | 9/2002 |

OTHER PUBLICATIONS

English Language Abstract for DE4122743 from EPO, Nov. 26, 1992.
English Language Abstract for DE 19613547 from EPO, Nov. 7, 1996.
English Language Abstract for DE4328092 from EPO, Feb. 23, 1995.
English Language Abstract for DE19920801 from EPO, Feb. 26, 2002.
English Language Abstract for DE19930664 from EPO, Jan. 11, 2001.
English Language Abstract for DE43 02 327 from EPO, Aug. 4, 1994.
English Language Translation for DE 198 26 715, Detlef.
English Language Abstract for EP 0 297 576 from EPO, Jan. 4, 1989.
English Language Abstract for EP 0 940 459 from EPO, Sep. 8, 1999.
English Language Abstract for EP0 872 502 from EPO, Oct. 21, 1998.
English Translation of DE19826715, Wolfgang, et al., Jan. 28, 1999, pp. 1-12.
English Abstract for JP06-286008 from EPO, Oct. 11, 1994.
Houben-Weyl, "Methoden der organischen chemie", vol. 14/2, 4th Edition, Georg Tjieme Verlag,Stuttgart, 1963, pp. 61-70, by W. Siefken, Liebigs Annalen der Chemie, vol 562, pp. 75-136.
Singh and coworkers, "Carbamylmethylated Melamines, Novel Crosslinklers for the Coatings Industry" in Advanced Organic Coating Science and Technology Series, 1991, vol. 13, pp. 193-207 @ p. 47, LL. 11-14.
U.S. Appl. No. 09/236,426, filed Mar. 5, 1999, Fritz Bartol et al.
U.S. Appl. No. 10/470,863, filed Dec. 15, 2003, Baumgart et al.
U.S. Appl. No. 10/018,106, filed Jan. 11, 2002, Allard et al.
U.S. Appl. No. 10/009,394, filed Oct. 25, 2001, Allard et al.

* cited by examiner

PROCESS FOR PRODUCING MULTICOAT COLOR AND/OR EFFECT PAINT SYSTEMS CURABLE THERMALLY AND WITH ACTINIC RADIATION

CROSS REFERENCE TO RELATED APPLICATIONS

This application is a National Phase Application of Patent Application PCT/EP03/000967 filed on 31 Jan. 2003, which claims priority to DE 102 06 225.0, filed on 15 Feb. 2002.

The present invention relates to a novel process for producing multicoat color and/or effect paint systems.

Multicoat color and/or effect paint systems and processes for producing them are known. They are used in particular for the finishing of motor vehicles, especially commercial vehicles and automobiles. The "automobile structure" of the multicoat color and/or effect paint systems, as is defined in Römpp Lexikon Lacke und Druckfarben, Georg Thieme Verlag, Stuttgart, N.Y., 1998, page 50, "automotive coating process", consists generally of electrocoat, primer, surfacer coat or antistonechip primer coat, basecoat and clearcoat.

The use of the multicoat color and/or effect paint systems as the automobile structure presupposes "automobile quality". According to European patent EP 0 352 298 B 1, page 15 line 42 to page 17 line 14, this means that the multicoat color and/or effect paint systems in question are required to exhibit
(1) high gloss,
(2) high distinctiveness of image,
(3) high and uniform hiding power,
(4) uniform dry film thickness,
(5) high gasoline resistance,
(6) high solvent resistance,
(7) high acid resistance,
(8) high hardness,
(9) high abrasion resistance,
(10) high scratch resistance,
(11) high impact strength,
(12) high intercoat adhesion and substrate adhesion, and
(13) high weathering stability and UV resistance.

These conditions must be met not only by the multicoat color and/or effect paint systems located on the motor vehicle bodies but also by those located on mounted components, such as protectors, wheel arches, doors, trunk lids, spoilers or lamp reflectors which are produced not from metal but instead from plastics, especially fiber reinforced plastics, SMC (Sheet Molded Compounds), BMC (Bulk Molded Compounds), IMC (Injection Molded Compounds), and RIMC (Reaction Injection Molded Compounds).

As is known, the multicoat color and/or effect paint systems are produced by applying to the electrocoated motor vehicle bodies or mounted components a primer or surfacer which in by far the majority of cases is independently heat-cured. In accordance with the technique known as wet-on-wet, a basecoat material and a clearcoat material are then applied to the resulting surfacer coat or antistonechip primer coat, after which the resulting films are jointly heat-cured. This technique has the disadvantage that it can be used to coat only particularly heat-stable substrates.

In order to accelerate curing and to be able to coat even thermally labile substrates, attempts have been made to replace the heat-curable coating materials by coating materials that can be cured using actinic radiation.

Hereinbelow, actinic radiation means electromagnetic radiation, such as near infrared (NIR), visible light, UV radiation, and X-rays, especially UV radiation, and corpuscular radiation, such as electron beams.

In many cases, however, the pigmented coating materials, such as primers, surfacers or antistonechip primers and basecoat materials, are difficult to cure, owing to the interaction of the actinic radiation with the pigments. With the clearcoat materials, of course, this problem does not arise, although the rapid reactions and high crosslinking density may cause shrinkage in the resultant clearcoats. Not least, the shadow zones of complex three-dimensional substrates can be cured optimally only by using highly complex apparatus. Cavities, folds and other structural undercuts have to be cured using pointwise, small-area or all-round lamps, in conjunction with an automatic movement means for the irradiation of cavities or edges.

In order to solve the problems associated with the use of coating materials curable by means of heat alone and by means of actinic radiation alone, use has already been made of coating materials which can be cured thermally and with actinic radiation. These dual-cure coating materials, as they are known, have the advantage that an insufficient heat cure of the coatings in question on a thermolabile substrate can be compensated by an actinic radiation cure. Conversely, inadequate radiation curing in shadow regions of complex three-dimensional substrates can be compensated by the heat cure.

It is, however, a disadvantage that each individual applied film must be cured by means both of heat and of actinic radiation. This leads to unwanted prolonging of the process times and to an increase in the energy consumption. Moreover, it necessitates a series of dual-cure stations, which makes the process more complex not only in terms of apparatus but also in terms of the measurement and control technology. Not least, the risk exists of increased levels of dust owing to the prolonged process times, thereby reducing the quality of the resulting multicoat color and/or effect paint systems.

Frequently, therefore, when producing multicoat color and/or effect paint systems, a dual-cure coating material is employed only in order to solve specific problems that are associated with a certain paint film or coat. The materials in question are frequently dual-cure clearcoat materials.

For example, international patent application WO 98/40170 discloses a dual-cure clearcoat material for a wet-on-wet technique in which a film of a basecoat material is overcoated with a clearcoat material and then the resulting clearcoat film is exposed to actinic radiation prior to the joint bake. Based on its solids, the clearcoat material contains from 50 to 98% by weight of a system A) which is curable thermally by addition and/or condensation reactions, is substantially free from radically polymerizable double bonds and is substantially free from groups which are otherwise reactive with radically polymerizable double bonds in the system B), and from 2 to 50% by weight of a system B) which can be cured by exposure to actinic radiation, by radical polymerization of olefinic double bonds.

Said system A) preferably comprises a hydroxy-functional acrylic binder with a hydroxyl number of from 30 to 300, preferably from 50 to 250, mg KOH/g and a number-average molar mass of from 1000 to 10,000 daltons, and a crosslinking agent, which may, inter alia, be a polyisocyanate.

The system B), curable by radical polymerization of olefinic double bonds, can be a hexafunctional aliphatic urethane acrylate with a theoretical molar weight of 1000.

European patent application EP 0 928 800 A 1 discloses dual-cure clearcoat materials containing isocyanato acrylates and hydroxy-functional copolymers which are prepared essentially from (meth)acrylates, hydroxyalkyl. (meth)acrylates, and optionally styrene and/or other monomers, such as acrylonitrile, for example. Similar dual-cure clearcoat materials, additionally containing hydroxyl- and/or thiol-functional reactive diluents, are known from international patent application WO 00/73395.

Furthermore, German patent application DE 199 20 799 A 1 or international patent application WO 00/68323 discloses dual-cure clearcoat materials which comprise (a1) at least one constituent, a urethane (meth)acrylate, for example, containing
  (a11) at least two functional groups, acrylate groups for example, which serve for crosslinking with actinic radiation, and if desired
  (a12) at least one functional group, hydroxyl groups for example, which are able to undergo thermal crosslinking reactions with a complementary functional group (a22) in constituent (a2), and (a2) at least one constituent, an isocyanato acrylate, for example, containing
  (a21) at least two functional groups, acrylate groups for example, which serve for crosslinking with actinic radiation, and
  (a22) at least one functional group, an isocyanate group for example, which is able to undergo thermal crosslinking reactions with a complementary functional group (a12) in constituent (a1), and also, if desired,
(a3) at least one photoinitiator,
(a4) at least one thermal crosslinking initiator,
(a5) at least one reactive diluent curable thermally and/or with actinic radiation,
(a6) at least one coatings additive, and/or
(a7) at least one heat-curable constituent, with the proviso that the coating material comprises at least one heat-curable constituent (a7) if constituent (a1) contains no functional group (a12).

These known dual-cure clearcoat materials are applied wet-on-wet to basecoat films, after which the clearcoat films are first exposed to actinic radiation and then heat-cured together with the basecoat films. This process, however, does not entirely solve the problems associated with the use of heat-curable coating materials in the production of automobile-quality multicoat color and/or effect paint systems.

The dual-cure coating material of German patent application DE 199 20 799 A 1 or of international patent application WO 00/68323 may also, however, be used as a dual-cure primer. An integrated process in which the dual-cure coating material is used both as dual-cure primer and as dual-cure clearcoat material is described in neither of the patent applications.

Where the abovementioned mounted components for motor vehicle bodies, based on fiber reinforced plastics, such as SMC (Sheet Molded Compounds), BMC (Bulk Molded Compounds), IMC (Injection Molded Compounds), and RIMC (Reaction Injection Molded Compounds), are to be coated in automobile quality, further problems arise.

These components do per se possess high temperature stability and withstand temperatures of 190 to 200° C. with little deformation. Moreover, using this technology, the complex mounted components can be produced in lighter weight and with greater precision than using reinforced thermoplastics. A disadvantage, however, is that the surface of the substrates is microporous and therefore cannot be coated directly, since at from 70 to 80° C. the coating is affected by the formation of microbubbles (blisters) caused by outgassing monomers, such as styrene. It is therefore necessary to seal the surfaces, a task for which the dual-cure primer of German patent application DE 199 20 799 A 1 or of international patent application WO 00/68323 is very well suited. Before the application of further paint films, however, the primer is subjected to complete dual cure, with the consequence that the sealing technique is unable to fully solve the problems associated with the use of dual-cure coating materials in the production of automobile-quality multicoat color and/or effect paint systems.

German patent application DE 101 13 884.9, unpublished at the priority date of the present specification, describes a process for coating microporous surfaces such as are present in the abovementioned mounted components. The microporous surfaces contain pores with a size of from 10 to 1500 nm.

In this process, the surface in question is coated with at least one coating material curable thermally and with actinic radiation, after which the resultant film(s) is(are) cured thermally and with actinic radiation, the coating material or at least one of the coating materials comprising (a1) at least one constituent containing
  (a11) on average per molecule at least two functional groups containing at least one bond which can be activated with actinic radiation and serves for crosslinking with actinic radiation, and if desired
  (a12) at least one isocyanate-reactive group,
(a2) at least one heat-curable constituent containing at least two isocyanate-reactive groups, and
(a3) at least one polyisocyanate.

With the process described, drying and actinic radiation exposure of the SMC and BMC parts coated with the dual-cure primer or sealer can be followed immediately by their overcoating, preferably in a state of incomplete cure.

The sealer coats can be overcoated outstandingly using any customary and known aqueous or conventional, liquid or solid, water-free and solvent-free, physically or thermally and/or actinically curable primers, electrocoat materials, surfacers or antistonechip primers, solid-color and/or effect topcoats or basecoats, and also clearcoats, there being no express indication as to whether the sealers are cured completely or partially by dual-cure techniques.

The example discloses a process wherein, following application, the dual-cure primer or sealer is flashed off and dried and then exposed to UV radiation. The resulting part-cured, electrically conductive sealer coats were immediately overcoated with customary primers or electrocoat materials. This was followed by complete curing. There is no description of the coating of the sealer coats with basecoat and clearcoat materials.

It is an object of the present invention to provide a novel integrated process for producing multicoat color and/or effect paint systems that no longer has the disadvantages of the prior art processes but instead provides automobile-quality multicoat color and/or effect paint systems rapidly, reliably, cost-effectively, energy-savingly and with comparatively low complexity in terms of apparatus and measurement and control technology. Overall it is intended that the novel integrated process should manage with fewer coating stations in the line than conventional processes.

In particular, the novel integrated process ought to avoid the disadvantages associated with the use of thermally curable coating materials and to permit the coating even of thermally labile substrates.

Furthermore, the novel integrated process ought not to have the disadvantages associated with the use of coating materials that can be cured only with actinic radiation. For instance, pigmented coating materials as well should be curable rapidly, and the curing of clearcoat materials should no longer be attended by shrinkage of the resulting clearcoats. The novel integrated process ought not least to reduce significantly the number of additional movable exposure devices which normally have to be employed when coating complex three-dimensional substrates, or to render obsolete the movable exposure devices.

Furthermore, the novel integrated process ought also to prevent the disadvantages associated with the use of dual-cure coating materials. In particular it should no longer be necessary to use a series of dual-cure stations. It ought to be possible to shorten the process times, thereby reducing significantly the risk of dust deposition on the partially cured multicoat color and/or effect paint systems.

The novel integrated process ought not least to allow the automobile-quality coating of microporous surfaces such as are present on SMC, BMC, IMC or RIMC parts with microbubble-free, multicoat color and/or effect paint systems.

The invention accordingly provides the novel integrated process for producing multicoat color and/or effect paint systems comprising (A) at least one primer,
(B) at least one color and/or effect basecoat, and
(C) at least one clearcoat by
(I) applying at least one pigmented or unpigmented primer (A) curable thermally and with actinic radiation to a substrate to give at least one primer film (A),
(II) exposing the primer film(s) (A) to actinic radiation to give at least one partially cured primer film (A) which can still be thermally cured,
(III) applying at least one pigmented coating material (B) curable thermally and/or at least one pigmented coating material (B) curable thermally and with actinic radiation to the outer surface of the partially cured primer film(s) (A) to give at least one pigmented film (B) which can still be cured thermally or both thermally and with actinic radiation,
(IV) exposing the film(s) (B) curable thermally and with actinic radiation to actinic radiation to give at least one partially cured film (B) which can still be thermally cured,
(V) applying at least one clearcoat material (C) curable with actinic radiation and/or at least one clearcoat material (C) curable thermally and with actinic radiation to the outer surface of the film(s) (B) to give at least one clearcoat film (C) curable with actinic radiation and/or at least one clearcoat film (C) curable thermally and with actinic radiation,
(VI) exposing the clearcoat film(s) (C) curable with actinic radiation and/or thermally and with actinic radiation to actinic radiation to give at least one clearcoat (C) cured with actinic radiation and/or at least one partially cured clearcoat film (C) which can still be thermally cured, and
(VII) subjecting the primer film(s) (A), the pigmented film(s) (B), and the still thermally curable clearcoat film(s) (C) to joint thermal curing.

The novel integrated process for producing multicoat color and/or effect paint systems is referred to below as "process of the invention".

In the light of the prior art it was surprising and unforeseeable for the skilled worker that the object on which the present invention was based could be achieved by means of the process of the invention.

Thus the process of the invention was surprisingly found to operate rapidly, reliably, cost-effectively, energy-savingly and with comparatively little complexity in terms of apparatus and measurement and control technology to give automobile-quality multicoat color and/or effect paint systems, and managed overall with fewer coating stations than the conventional processes.

Surprisingly, the process of the invention also allowed the coating of thermally labile substrates.

The coating materials used were cured rapidly, and the curing of clearcoat materials was no longer attended by shrinkage of the resulting clearcoats. With the process of the invention it was possible not least, surprisingly, to achieve a significant reduction in the number of additional movable exposure devices which normally have to be employed in the coating of complex three-dimensional substrates, and it was possible in many cases to do entirely without the movable exposure devices.

It was, surprisingly, no longer necessary to use a series of dual-cure stations. As a result, the process times were shortened, with a corresponding marked reduction in the risk of dust deposition on the partially cured multicoat color and/or effect paint systems.

Not least, the novel integrated process surprisingly allowed the coating of microporous surfaces such as are present on SMC, BMC, IMC or RIMC parts with automobile-quality, microbubble-free multicoat color and/or effect paint systems.

The process of the invention is an integrated process. This means that its individual steps are tailored precisely to one another in terms of space and time so that in plant practice it can be carried out continuously on the paint line of an automaker.

In the process of the invention, substrates are coated. The substrates may be planar or three-dimensional in form and may have a microporous surface. It is a key advantage of the process of the invention that even three-dimensional substrates of complex shape, with or without a microporous surface, can be successfully coated.

The substrates may be made of any of a wide variety of materials. Examples of suitable materials are wood, glass, leather, plastics, metals, especially reactive utility metals, such as iron, steel, stainless steel, zinc, aluminum, titanium and their alloys with one another and with other metals; minerals, especially fired and unfired clay, ceramic, natural stone and artificial stone; foams; fiber materials, especially glass fibers, ceramic fibers, carbon fibers, textile fibers, polymer fibers or metal fibers, and composite fibers; or fiber reinforced materials, especially plastics reinforced with the abovementioned fibers. Further examples of suitable substrates are known from German patent applications DE 199 24 172 A 1, page 8 lines 21 to 37, or DE 199 30 067 A 1, page 13 line 61 to page 14 line 16.

Accordingly, the process of the invention can be employed with advantage in any of a wide variety of technological fields. It can be used with preference for coating motor vehicle bodies, especially commercial and passenger vehicle bodies, and also parts, especially mounted components, thereof, the inside and outside of buildings and parts thereof, doors, windows, furniture, and hollow glassware, and, in the context of industrial coatings, for coating coils, containers, packaging, small parts, such as nuts, bolts, wheel rims or hubcaps, electrical components, such as wound products (coils, stators, rotors); and components for white goods, such as radiators, domestic appliances, refrigerator casings or washing machine casings. The very special advantages of the process of the invention are evident in the coating of motor vehicle bodies and their mounted components, particularly mounted components based on SMC, BMC, IMC, and RIMC.

In the context of the process of the invention, the coating materials used are applied to the substrates by means of customary and known application techniques. The particular application technique employed in any one case is guided in particular by whether the coating material is liquid or pulverulent. Examples of suitable application techniques include electrocoating, fluid bed coating, spraying, injecting, knifecoating, spreading, flowcoating, dipping, trickling or rolling. It is preferred to employ spray application methods, except where the coating materials are powders.

During application it is advisable to operate in the absence of actinic radiation in order to prevent premature crosslinking of the dual-cure coating materials.

The applied coating materials are preferably cured after a certain rest period or flashoff period. This period can have a duration of from 30 s to 2 h, preferably from 1 min to 1 h, and in particular from 1 to 45 min. The rest period is used, for example, for leveling and devolatilization of the applied coating materials and for the evaporation of volatile constituents such as any solvent and/or water present. Flashing off can be accelerated by an elevated temperature, but still less than that required for curing, and/or by reduced atmospheric humidity.

Curing with actinic radiation is carried out using a radiation dose of preferably from $10^3$ to $4 \times 10^4$, more preferably from $2 \times 10^3$ to $3 \times 10^4$, more preferably still from $3 \times 10^3$ to $2.5 \times 10^4$, and in particular from $5 \times 10^3$ to $2 \times 10^4$ J m$^{-2}$. The radiative intensity is from $1 \times 10$ to $3 \times 10^5$, preferably from $2 \times 10^0$ to $2 \times 10^5$, more preferably from $3 \times 10^0$ to $1.5 \times 10^5$, and in particular from $5 \times 10^0$ to $1.2 \times 10^5$ W m$^{-2}$.

Curing with actinic radiation is carried out using the customary and known radiation sources and optical auxiliary measures. Examples of suitable radiation sources are flashlights from the company VISIT, high or low pressure mercury vapor lamps, which may have been doped with lead in order to open up a radiation window of up to 405 nm, or electron beam sources. Their arrangement is known in principle and can be adapted to the circumstances of the workpiece and the process parameters. In the case of workpieces of complex shape, as are envisaged for automobile bodies, those regions not accessible to direct radiation (shadow regions), such as cavities, folds and other structural undercuts, may be cured using pointwise, small-area or all-round light sources in conjunction with an automatic movement means for the irradiation of cavities or edges. It is a particular advantage of the process of the invention that, to a large extent, there is no need for these movable exposure means.

The equipment and conditions for these curing methods are described, for example, in R. Holmes, U.V. and E.B. Curing Formulations for Printing Inks, Coatings and Paints, SITA Technology, Academic Press, London, United Kingdom 1984, in German patent application DE 198 18 735 A 1, column 10 line 31 to column 11 line 16, in R. Stephen Davidson, "Exploring the Science, Technology and Applications of U.V. and E.B. Curing", Sita Technology Ltd., London, 1999, or in Dipl.-Ing. Peter Klamann, "eltosch System-Kompetenz, UV-Technik, Leitfaden für Anwender", page 2, October 1998. With particular preference, actinic radiation curing is carried out under an oxygen-depleted atmosphere.

Joint thermal curing of the applied coating materials takes place with the aid, for example, of a gaseous, liquid and/or solid hot medium, such as hot air, heated oil or heated rollers, or with the aid of microwave radiation, infrared light and/or near infrared (NIR) light. Heating preferably takes place in a forced air oven or by exposure to IR and/or NIR lamps. As in the case of curing with actinic radiation, thermal curing as well may be carried out in stages. Advantageously, thermal curing is effected at temperatures from room temperature to 200° C.

In the process of the invention, at least one, especially one, pigmented or unpigmented dual-cure primer (A) is applied to the substrate surface to give at least one, especially one, primer film (A).

The physical composition of the pigmented or unpigmented dual-cure primer is not critical; rather, it is possible to employ the dual-cure coating materials that are known from international patent application WO 00/73395, page 4 lines 4 to 30, page 6 line 13 to page 27 line 13, and page 34 lines 11 to 22, or international patent application WO 00/68323, page 3 line 5 to page 4 line 15, page 7 line 29 to page 28 line 5, and page 34 lines 5 to 17.

Particular preference is given to using a dual-cure primer (A) comprising (a1) at least one constituent containing
  (a11) on average per molecule at least two functional groups containing at least one bond which can be activated with actinic radiation and which serves for crosslinking with actinic radiation, and if desired
  (a12) at least one isocyanate-reactive group,
(a2) at least one thermally curable constituent containing at least two isocyanate-reactive groups, and (a3) at least one polyisocyanate.

The particularly preferred dual-cure primer (A) comprises at least one constituent (a1) containing on average per molecule at least two, in particular at least three, functional groups (a11) which contain at least one, especially one, bond which can be activated with actinic radiation and which serves for crosslinking with actinic radiation, and if desired at least one, in particular at least two, isocyanate-reactive group(s) (a12).

With preference, the dual-cure primer (A) contains on average per molecule not more than six, in particular not more than five, functional groups (a11).

Examples of suitable bonds which can be activated with actinic radiation are carbon-hydrogen single bonds or carbon-carbon, carbon-oxygen, carbon-nitrogen, carbon-phosphorus or carbon-silicon single bonds or double bonds. Of these, the double bonds, especially the carbon-carbon double bonds, are employed with preference.

Highly suitable carbon-carbon double bonds are present, for example, in (meth)acrylate, ethacrylate, crotonate, cinnamate, vinyl ether, vinyl ester, ethenylarylene, dicyclopentadienyl, norbornenyl, isoprenyl, isopropenyl, allyl or butenyl groups, ethenylarylene ether, dicyclopentadienyl ether, norbornenyl ether, isoprenyl ether, isopropenyl ether, allyl ether or butenyl ether groups, or ethenylarylene ester, dicyclopentadienyl ester, norbornenyl ester, isoprenyl ester, isopropenyl ester, allyl ester or butenyl ester groups. Of these, (meth)acrylate groups, especially acrylate groups, are of particular advantage and are therefore used with very particular preference in accordance with the invention.

Examples of suitable isocyanate-reactive groups (a12) are thiol, primary or secondary amino, imino or hydroxyl groups, especially hydroxyl groups.

The constituent (a1) is oligomeric or polymeric.

For the purposes of the present invention, an oligomer is a compound generally containing on average from 2 to 15 basic structures or monomer units. A polymer, on the other hand, is a compound generally having on average at least 10 basic structures or monomer units. Compounds of this kind are also referred to by those in the art as binders or resins.

In contradistinction thereto, a low molecular mass compound for the purposes of the present invention is a compound which derives essentially only from one basic structure or one monomer unit. Compounds of this kind are generally referred to by those in the art as reactive diluents.

The polymers or oligomers used as binder (a1) normally have a number-average molecular weight of from 500 to 50,000, preferably from 1000 to 5000. They have a double bond equivalent weight of preferably from 400 to 2000, with particular preference from 500 to 900. In addition, they preferably have a viscosity at 23° C. of from 250 to 11,000 mPas. They are preferably employed in an amount of from 5 to 50% by weight, more preferably from 6 to 45% by weight, with particular preference from 7 to 40% by weight, with very particular preference from 8 to 35% by weight, and in particular from 9 to 30% by weight, based in each case on the solids of the coating material of the invention.

Examples of suitable binders or resins (a1) come from the oligomer and/or polymer classes of the (meth)acryloyl-functional (meth)acrylic copolymers, polyether acrylates, polyester acrylates, polyesters, epoxy acrylates, urethane acrylates, amino acrylates, melamine acrylates, silicone acrylates and phosphazene acrylates, and the corresponding methacrylates. It is preferred to use binders (a1) that are free from aromatic structural units. Preference is therefore given to using urethane (meth)acrylates, phosphazene (meth)acrylates and/or polyester (meth)acrylates, with particular preference urethane (meth)acrylates, especially aliphatic urethane (meth) acrylates.

The urethane (meth)acrylates (a1) are obtained by reacting a diisocyanate or polyisocyanate with a chain extender from the group of the diols/polyols and/or diamines/polyamines and/or dithiols/polythiols and/or alkanolamines and then reacting the remaining free isocyanate groups with at least one hydroxyalkyl (meth)acrylate or hydroxyalkyl ester of other ethylenically unsaturated carboxylic acids.

The amounts of chain extenders, diisocyanates and/or polyisocyanates, and hydroxyalkyl esters are preferably chosen so that 1.) the equivalents ratio of the NCO groups to the reactive groups of the chain extender (hydroxyl, amino and/or mercaptyl groups) is situated between 3:1 and 1:2, preferably at 2:1, and 2.) the OH groups of the hydroxyalkyl esters of the ethylenically unsaturated carboxylic acids are present in a stoichiometric amount in relation to the remaining free isocyanate groups of the prepolymer formed from isocyanate and chain extender.

It is also possible to prepare the urethane (meth)acrylates by first reacting some of the isocyanate groups of the diisocyanate or polyisocyanate with at least one hydroxyalkyl ester and then reacting the remaining isocyanate groups with a chain extender. In this case as well the amounts of chain extender, isocyanate, and hydroxyalkyl ester are chosen so that the equivalents ratio of the NCO groups to the reactive groups of the chain extender is situated between 3:1 and 1:2, preferably at 2:1, and the equivalents ratio of the remaining NCO groups to the OH groups of the hydroxyalkyl ester is 1:1. Of course, all forms intermediate between these two techniques are also possible. For example, some of the isocyanate groups of the diisocyanate can be reacted first with a diol and then a further portion of the isocyanate groups can be reacted with the hydroxyalkyl ester, after which the remaining isocyanate groups can be reacted with a diamine.

Flexibilization of the urethane (meth)acrylates (a1) is possible, for example, by reacting corresponding isocyanate-functional prepolymers and/or oligomers with longer-chain, aliphatic diols and/or diamines, especially aliphatic diols and/or diamines having at least 6 carbon atoms. This flexibilizing reaction can be carried out before or after the addition of acrylic and/or methacrylic acid onto the oligomers and/or prepolymers.

As examples of suitable urethane (meth)acrylates (a1) mention may also be made of the following, commercially available polyfunctional aliphatic urethane acrylates:

Crodamer® UVU 300 from Croda Resins Ltd., Kent, UK;
Genomer® 4302, 4235, 4297 or 4316 from Rahn Chemie, CH;
Ebecryl® 284, 294, IRR 351, 5129 or 1290 from UCB, Drogenbos, B;
Roskydal® LS 2989 or LS 2545 or V94-504 from Bayer A G, D;
Viaktin® VTE 6160 from Vianova, AT; or
Laromer® 8861 from BASF AG, and experimental modifications thereof.

Hydroxyl-containing urethane (meth)acrylates (a1) are known, for example, from patents U.S. Pat. Nos. 4,634,602 A or 4,424,252 A.

One example of a suitable polyphosphazene (meth)acrylate (a1) is the phosphazene dimethacrylate from Idemitsu, Japan.

The dual-cure polymer (A) further comprises at least one thermally curable constituent (a2) containing at least two, in particular at least three, isocyanate-reactive groups. Examples of suitable isocyanate-reactive groups are those described above.

The constituent (a2) is oligomeric or polymeric.

Examples of suitable constituents (a2) are linear and/or branched and/or block, comb and/or random oligomers or polymers, such as (meth)acrylate (co)polymers, polyesters, alkyds, amino resins, polyurethanes, polylactones, polycarbonates, polyethers, epoxy resin-amine adducts, (meth)acrylate diols, partially hydrolyzed polyvinyl esters or polyureas, of which the (meth)acrylate copolymers, the polyesters, the polyurethanes, the polyethers and the epoxy resin-amine adducts, but especially the polyesters, are advantageous.

Suitable binders (a2) are sold, for example, under the tradenames Desmophen® 650, 2089, 1100, 670, 1200 or 2017 by Bayer, under the tradenames Priplas or Pripol® by Uniqema, under the tradenames Chempol® polyester or polyacrylate-polyol by CCP, under the tradenames Crodapol® 0-25, 0-85 or 0-86 by Croda, or under the tradename Formez® ER417 by Witco.

The fraction of the constituents (a2) in the coating materials may vary widely and is guided by the requirements of the case in hand. They are preferably employed in an amount of from 5 to 90% by weight, more preferably from 6 to 80% by weight, with particular preference from 7 to 70% by weight, with very particular preference from 8 to 60% by weight, and in particular from 9 to 50% by weight, based in each case on the solids of the coating material.

The coating material further comprises at least one polyisocyanate (a3).

The polyisocyanates (a3) are preferably selected from the group consisting of polyisocyanates containing on average per molecule at least from 2.0 to 10, preferably from 2.1 to 6, blocked and/or nonblocked isocyanate groups. It is preferred to select the polyisocyanates from the group consisting of polyisocyanates containing on average per molecule at least one isocyanurate, biuret, allophanate, iminooxadiazinedione, urethane, urea, carbodiimide and/or uretdione group.

Examples of suitable polyisocyanates (a3) are known from German patent application DE 199 24 170 A 1, column 3 line 61 to column 6 line 14 and column 10 line 60 to column 11 line 38, or from specifications CA 2,163,591 A, U.S. Pat. Nos. 4,419,513 A, 4,454,317 A, EP 0 646 608 A 1, U.S. Pat. No. 4,801,675 A, EP 0 183 976 A 1, DE 40 15 155 A 1, EP 0 303 150 A 1, EP 0 496 208 A 1, EP 0 524 500 A 1, EP 0 566 037 A 1, U.S. Pat. Nos. 5,258,482 A 1, 5,290,902 A 1, EP 0 649 806 A 1, DE 42 29 183 A 1 or EP 0 531 820 A 1, or are described in German patent application DE 100 05 228.2, unpublished at the priority date of the present specification. Also suitable are the high-viscosity polyisocyanates as described in German patent application DE 198 28 935 A 1, the polyisocyanate particles deactivated on their surface by urea formation and/or blocking, as specified in European patent applications EP 0 922 720 A 1, EP 1 013 690 A 1 and EP 1 029 879 A 1, or nonyl triisocyanate (NTI). Suitable, furthermore, are the adducts, described by German patent application DE 196 09 617 A 1, of polyisocyanates with dioxanes, dioxolanes and oxazolidines which contain isocyanate-reactive functional groups and contain isocyanate groups which are still free, and also the isocyanato acrylates of European patent application EP 0 928 800 A 1, as polyisocyanates (a3).

The polyisocyanates (a3) may be fully or partly blocked. Examples of suitable blocking agents for blocking the free isocyanate groups in the polyisocyanates (a3) are known from German patent application DE 199 24 170 A 1, column 6 lines 19 to 53.

The amount of polyisocyanates (a3) in the dual-cure primer (A) may vary very widely and is guided by the requirements of the case in hand, in particular by the amount of isocyanato-reactive groups in the constituents (a2) and, where appropriate, (a1). The amount is preferably from 5 to 50% by weight, more preferably from 6 to 45% by weight, with particular preference from 7 to 40% by weight, with very particular preference from 8 to 35% by weight, and in particular from 9 to 30% by weight, based in each case on the solids of the dual-cure primer (A).

The dual-cure primer (A) may further comprise at least one pigment and/or filler. The compound in question may comprise color and/or effect, fluorescent, electrically conductive, magnetically shielding and/or anticorrosion pigments, metal powders, scratchproofing pigments, organic dyes, organic and inorganic, transparent or opaque fillers and/or nanoparticles.

Where the coating material is used for producing electrically conductive primers (A), it preferably comprises at least one electrically conductive pigment and/or at least one electrically conductive filler.

Examples of suitable effect pigments are metal flake pigments such as commercial aluminum bronzes, the chromated aluminum bronzes of DE 36 36 183 A 1, and commercial stainless steel bronzes, and also nonmetallic effect pigments, such as pearlescent pigments and interference pigments, for example, platelet-shaped effect pigments based on iron oxide with a shade ranging from pink to brownish red, or liquid-crystalline effect pigments. For further details, refer to Römpp Lexikon Lacke und Druckfarben, Georg Thieme Verlag, 1998, pages 176, "effect pigments" and pages 380 and 381 "metal oxide-mica pigments" to "metal pigments", and to the patent applications and patents DE 36 36 156 A 1, DE 37 18 446 A 1, DE 37 19 804 A 1, DE 39 30 601 A 1, EP 0 068 311 A 1, EP 0 264 843 A 1, EP 0265 820 A 1, EP 0 283 852 A 1, EP 0293 746 A 1, EP 0 417 567 A 1, U.S. Pat. Nos. 4,828,826 A or 5,244,649 A.

Examples of suitable inorganic color pigments are white pigments such as titanium dioxide, zinc white, zinc sulfide or lithopone; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, refer to Römpp Lexikon Lacke und Druckfarben, Georg Thieme Verlag, 1998, pages 180 and 181, "iron blue pigments" to "black iron oxide", pages 451 to 453 "pigments" to "pigment volume concentration", page 563 "thioindigo pigments", page 567 "titanium dioxide pigments", pages 400 and 467, "naturally occurring pigments", page 459 "polycyclic pigments", page 52, "azomethine pigments", "azo pigments", and page 379 "metal complex pigments".

Examples of fluorescent pigments (daylight-fluorescent pigments) are bis(azomethine) pigments.

Examples of suitable electrically conductive pigments are titanium dioxide/tin oxide pigments.

Examples of magnetically shielding pigments are pigments based on iron oxides or chromium dioxide.

Examples of suitable metal powders are powders of metals and metal alloys such as aluminum, zinc, copper, bronze or brass.

Suitable soluble organic dyes are lightfast organic dyes having little or no tendency to migrate from the novel aqueous multicomponent coating material or from the coatings produced from it. The migration tendency can be estimated by the skilled worker on the basis of his or her general art knowledge and/or determined by means of simple preliminary range finding tests, as part of tinting trials, for example.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially of polyamide or polyacrylonitrile. For further details, refer to Römpp Lexikon Lacke und Druckfarben, Georg Thieme Verlag, 1998, page 250 ff., "fillers".

Examples of suitable transparent fillers are those based on silica, alumina or zirconium oxide, but especially nanoparticles on this basis.

The amount of the above-described pigments and/or fillers in the dual-cure primer (A) may vary very widely and is guided by the requirements of the case in hand. Based on the solids of the coating material it is preferably from 5 to 50%, more preferably from 5 to 45%, with particular preference from 5 to 40%, with very particular preference from 5 to 35%, and in particular from 5 to 30% by weight.

The dual-cure primer (A) may further comprise at least one tackifier. Tackifiers are polymeric additives for adhesives and increase the tack of said adhesives, i.e., their inherent stickiness or self-adhesion, so that they adhere firmly to surfaces after gentle brief applied pressure (cf. Ullmann's Encyclopedia of Industrial Chemistry, CD-ROM, Wiley VCH, Weinheim, 1997, "tackifiers").

Examples of suitable tackifiers are highly flexible resins selected from the group consisting of homopolymers of alkyl (meth)acrylates, especially alkyl acrylates, such as poly(isobutyl) acrylate or poly(2-ethylhexyl acrylate), which are sold under the brand name Acronal® by BASF Aktiengesellschaft, under the brand name Elvacite® by DuPont, under the brand name Neocryls by Avecia, and as Plexigum® by Roehm;

linear polyesters such as are commonly used for coil coating and are sold, for example, under the brand name Dynapol® by Dynamit Nobel, under the brand name Skybond® by SK Chemicals, Japan, or under the commercial designation LTW by Hüls; linear difunctional oligomers which are curable with actinic radiation and have a number-average molecular weight of more than 2000, in particular from 3000 to 4000, based on polycarbonatediol or polyesterdiol, which are sold under the designation CN 970 by Craynor or under the brand name Ebecryl® by UCB;

linear vinyl ether homopolymers and copolymers based on ethyl, propyl, isobutyl, butyl and/or 2-ethylhexyl vinyl ether, which are sold under the brand name Lutonal® by BASF Aktiengesellschaft; and nonreactive urethane-urea oligomers, which are prepared from bis(4,4-isocyanatophenyl)methane, N,N-dimethylethanolamine and diols such as propanediol, hexanediol or dimethylpentanediol and which are sold, for example, by Swift Reichold under the brand name Swift Range® or by Mictchem Chemicals under the brand names Surkopack® or Surkofilm®.

The tackifiers are used preferably in an amount of from 0.1 to 10% by weight, more preferably from 0.2 to 9% by weight, with particular preference from 0.3 to 8% by weight, with very particular preference from 0.4 to 7% by weight, and in particular from 0.5 to 6% by weight, based in each case on the solids of the coating material of the invention.

In addition, the dual-cure primer (A) may comprise at least one photoinitiator. If the coating material is to be crosslinked using UV radiation, it is generally necessary to use a photoinitiator. Where used, they are present in the dual-cure primer (A) in fractions of preferably from 0.1 to 10% by weight, more preferably from 0.2 to 8% by weight, with particular preference from 0.3 to 7% by weight, with very particular preference from 0.4 to 6% by weight, and in particular from 0.5 to 5% by weight, based in each case on the solids of the dual-cure primer (A).

Examples of suitable photoinitiators are those of the Norrish II type, whose mechanism of action is based on an intramolecular variant of the hydrogen abstraction reactions such as occur diversely in photochemical reactions (by way of example, refer here to Römpp Chemie Lexikon, 9, expanded and revised edition, Georg Thieme Verlag Stuttgart, vol. 4, 1991) or cationic photoinitiators (by way of example, refer here to Römpp Lexikon Lacke und Druckfarben, Georg Thieme Verlag Stuttgart, 1998, pages 444 to 446), especially benzophenones, benzoins or benzoin ethers, or phosphine oxides. It is also possible, for example, to employ the products available commercially under the names Irgacure® 184, Irgacure® 1800 and Irgacure® 500 from Ciba Geigy, Genocure® MBF from Rahn and Lucirin® TPO from BASF AG.

Besides the photoinitiators, customary sensitizers such as anthracene can be used, in effective amounts.

The dual-cure primer (A) may further comprise at least one additive selected from the group consisting of thermally curable reactive diluents; crosslinking agents other than the polyisocyanates (a3); light stabilizers, such as UV absorbers and reversible radical scavengers (HALS); antioxidants; low-boiling and high-boiling ("long") organic solvents; devolatilizers; wetting agents; emulsifiers; slip additives; polymerization inhibitors; thermal crosslinking catalysts; thermolabile radical initiators; adhesion promoters; leveling agents; film formation auxiliaries; rheological aids; flame retardants; corrosion inhibitors; free-flow aids; waxes; siccatives; biocides; and flatting agents.

Examples of suitable additives are described in detail in the textbook "Lackadditive" [Additives for coatings] by Johan Bieleman, Wiley-VCH, Weinheim, N.Y., 1998, in D. Stoye and W. Freitag (Editors), "Paints, Coatings and Solvents", Second, Completely Revised Edition, Wiley-VCH, Weinheim, N.Y., 1998, "14.9. Solvent Groups", pages 327 to 373, in German patent application DE 199 14 896 A 1, column 14 line 26 to column 15 line 46, or in German patent application DE 199 08 018 A 1, page 9 line 31 to page 13 line 20. For further details refer to German patent applications DE 199 04 317 A 1 and DE 198 55 125 A 1.

Particular advantages result if in the dual-cure primer (A) the ratio of isocyanate groups to the sum of the isocyanate-reactive functional groups is <1.3, preferably from 0.5 to 1.25, more preferably from 0.75 to 1.1, with particular preference <1, and in particular from 0.75 to 1.

Further particular advantages result if the thermally curable constituent (a2) has a molecular weight polydispersity (mass-average molecular weight Mm/number-average molecular weight Mn) of <4, preferably <3.5, with particular preference from 1.5 to 3.5, and in particular from 1.5 to 3.

Furthermore, particular advantages also arise if in the dual-cure primer (A) the ratio of solids content of constituents curable with actinic radiation (UV) to solids content of constituents curable thermally (TH), viz. (UV)/(TH), is from 0.2 to 0.6, preferably from 0.25 to 0.5, and in particular from 0.3 to 0.45.

Particular advantages arise not least if the thermally curable constituent (a2), based on its overall amount, has an aromatic structural unit content of <5, preferably <2, and in particular from 0 to <2% by weight.

The above-described dual-cure primer (A) is prepared by mixing and homogenizing the constituents described above, using customary and known mixing methods and apparatus, such as stirred tanks, stirrer mills, extruders, compounders, Ultraturrax, inline dissolvers, static mixers, micromixers, toothed wheel dispersers, pressure relief nozzles and/or microfluidizers, preferably in the absence of actinic radiation.

Following its application, the dual-cure primer film (A) is exposed to actinic radiation to give a partly cured primer film (A) which can still be thermally cured.

Atop the partly cured dual-cure primer film (A) is or are applied at least one, especially one, thermally curable coating material (B) and/or at least one, in particular one, coating material (B) curable thermally and with actinic radiation. This results in at least one pigmented film (B) which can still be cured thermally or both thermally and with actinic radiation.

It is preferred to use a coating material (B) which is curable thermally or is curable both thermally and with actinic radiation.

As dual-cure coating materials (B) it is possible to use the pigmented dual-cure primers (A) described above.

As thermally curable coating materials (B) it is possible to use customary and known basecoat materials, especially aqueous basecoat materials, such as are known from patent applications EP 0 089 497 A 1, EP 0 256 540 A 1, EP 0 260

447 A 1, EP 0 297 576 A 1, WO 96/12747, EP 0 523 610 A 1, EP 0 228 003 A 1, EP 0 397 806 A 1, EP 0 574 417 A 1, EP 0 531 510 A 1, EP 0 581 211 A 1, EP 0 708 788 A 1, EP 0593454 A1, DE-A-4328092 A1, EP 0299148 A1, EP 0394737 A1, EP 0 590 484 A 1, EP 0 234 362 A 1, EP 0 234 361 A 1, EP 0 543 817 A 1, WO 95/14721, EP 0 521 928 A 1, EP 0 522 420 A 1, EP 0 522 419 A 1, EP 0 649 865 A 1, EP 0 536 712 A 1, EP 0 596 460 A 1, EP 0 596 461 A 1, EP 0 584 818 A 1, EP 0 669 356 A1, EP0 634 431 A1, EP0 678 536 A1, EP0 354 261 A1, EP0 424 705 A 1, WO 97/49745, WO 97/49747, EP 0 401 565 A 1, EP 0 496 205 A 1, EP 0 358 979 A 1, EP 469 389 A 1, DE 24 46 442 A 1, DE 34 09 080 A 1, DE 195 47 944 A1, DE 197 41 554 A 1 or EP0 817 684, column 5 lines 31 to 45.

Where a dual-cure film (B) is used, it is exposed to actinic radiation to give a partly cured film (B) which can still be thermally cured.

Atop the outer surface of the thermally curable films (B) there is applied at least one, especially one, dual-cure clearcoat material (C), thereby giving at least one, especially one, clearcoat film (C) which is curable thermally and with actinic radiation.

As dual-cure clearcoat material (C) it is possible to use the unpigmented dual-cure primer (A) described above. Also suitable are the clearcoat, powder clearcoat, and powder slurry clearcoat materials known from patent applications DE 198 18 735 A 1, WO 98/40170, DE 199 08 013 A 1, DE 199 08 018 A 1, EP 0 844 286 A 1 or EP 0 928 800 A 1, curable thermally and with actinic radiation, as dual-cure clearcoat materials (C).

Alternatively or in addition to the dual-cure clearcoat material (C) it is possible to apply at least one, especially one, clearcoat material (C) that is curable only with actinic radiation. Suitable clearcoat materials of this kind are known, for example, from the international patent application WO 98/40171.

Preference is given to employing dual-cure clearcoat materials (C).

The dual-cure clearcoat film (C) is exposed to actinic radiation to give a partly cured clearcoat film (C) which can still be thermally cured.

The clearcoat film (C) curable with actinic radiation is likewise exposed to actinic radiation to give a cured clearcoat (C).

Following this, the primer film(s) (A), the pigmented film(s) (B), and the partly cured clearcoat film(s) (C) are jointly cured thermally. If the clearcoat film(s) (C) has(have) already been fully cured and transformed into the clearcoat(s) (C), it is also possible for thermal curing to be omitted.

Overall, in accordance with the invention, the result is the multicoat color and/or effect paint system comprising at least one primer (A), at least one color and/or effect basecoat (B), and at least one clearcoat (C).

The multicoat color and/or effect paint system produced by the process of the invention may also be overcoated with other coating materials; for example, with sealers, such as are known from patent applications DE 199 10 876 A 1, DE 38 36 815 A 1, DE 198 43 581 A 1, DE 199 09 877 A 1, DE 139 40 858 A 1, DE 198 16 136 A 1, EP 0 365 027 A 2 or EP 0 450 625 A 1. Sealers are sold, inter alia, under the brand name Ormocer® (organically modified ceramic).

The process of the invention is rapid and reliable, cost effective, saves energy, and can be accomplished with comparatively little expenditure in terms of apparatus and also measurement and control technology. Overall, it manages with fewer coating stations in the line than in the case of conventional processes. The process of the invention can be used to coat even thermally labile substrates. In addition, the pigmented coating materials are rapidly cured and the curing of clearcoat materials is no longer accompanied by shrinkage of the resulting clearcoats. Not least it is possible to reduce significantly the number of additional movable exposure devices which are normally needed for use in coating complex three-dimensional substrates, and in many cases it is possible to do without them entirely. Furthermore, it is no longer necessary to use a series of dual-cure stations. Process times can be shortened, thereby markedly reducing the risk of dust deposition on the partly cured multicoat color and/or effect paint systems. The process of the invention makes it possible not least to coat microporous surfaces such as those on SMC, BMC, IMC or RIMC parts with microbubble-free, automobile-quality, multicoat color and/or effect paint systems. The adhesion of the inventively produced multicoat color and/or effect paint systems, and also the intercoat adhesion, are very good. The multicoat paint systems also have a very good overall appearance.

EXAMPLES

Preparation Examples 1 and 2

The Preparation of the Dual-cure Primers (A 1) and (A 2)

The dual-cure primer (A 1) was prepared by mixing the following components in this order:

32.1 parts by weight of a saturated polyester (Setal® 1615 SS 75, 75% solids in butyl acetate, from Akzo Nobel),
  14.9 parts by weight of an acrylated aliphatic urethane oligomer (IRR 351 from UCB, hydroxyl number: 75 to 90 mg KOH/g, number-average molecular weight (theoretical): 600 daltons, average double bond functionality (theoretical): 3.9),
  0.47 part by weight of a rheological aid (Bentone® SD2 from Rheox),
  0.24 part by weight of a commercial dispersing auxiliary (Antiterra® U from Byk),
  4.03 parts by weight of butyl acetate,
  22.6 parts by weight of a commercial pigment (Micavor® 20 from DAM Les Produits GmbH),
  0.47 part by weight of a leveling agent (Disparlon® LC 900 from King Industries),
  10.2 parts by weight of ethyl ethoxypropionate,
  2.0 min parts by weight of a tackifier (polyester tackifier resin LTW from Hüls, 60% in xylene),
  0.2 part by weight of a lithium salt catalyst (Nuodex® LI from OMG),
  0.1 part by weight of a photoinitiator (Irgacure® 819 from Ciba Specialties),
  0.96 part by weight of a photoinitiator (Lucirin® TPO from BASF Aktiengesellschaft), and
  11.73 parts by weight of ethyl ethoxypropionate, and also
  20 parts by weight of an HDI trimer (Desmodur® N 3390 from Bayer-Aktiengesellschaft, 90%)

and then homogenizing this mixture. The (UV)/(TH) ratio was 0.354.

The dual-cure primer (A 2) was prepared by mixing the following components in this order:

32.1 parts by weight of a saturated polyester (Setal® 1615 SS 75, 75% solids in butyl acetate, from Akzo Nobel),
  14.9 parts by weight of an acrylated aliphatic urethane oligomer (IRR 351 from UCB, hydroxyl number: 75 to 90 mg KOH/g, number-average molecular weight (theoretical): 600 daltons, average double bond functionality (theoretical): 3.9), 0.47 part by weight of a rheological aid (Bentone® SD2 from Rheox), 0.24 part by weight of a commercial dispersing auxiliary (Antiterra® U from Byk), 4.03 parts by weight of butyl acetate, 6.8 parts by weight of a commercial monocrystalline hydrated magnesium silicate (Mistron® Monomix from Luzenac Nev.), 0.47 part by weight of a leveling agent (Disparlon® LC 900 from King Industries), 10.2 parts by weight of ethyl ethoxypropionate, 15.8 parts by weight of an electrically conductive mica pigment (Minatec® 40CM from EM Industries), 2.0 min parts by weight of a tackifier (polyester tackifier resin LTW from Hüls, 60% in xylene), 0.2 part by weight of a lithium salt catalyst (Nuodex® LI from OMG), 0.1 part by weight of a photoinitiator (Irgacure® 819 from Ciba Specialties), 0.96 part by weight of a photoinitiator (Lucirin® TPO from BASF Aktiengesellschaft), and 11.73 parts by weight of ethyl ethoxypropionate, and also 20 parts by weight of an HDI trimer (Desmodur® N 3390 from Bayer-Aktiengesellschaft, 90%)

and then homogenizing this mixture. The (UV)/(TH) ratio was 0.354.

Preparation Example 3

The Preparation of a Methacrylate Copolymer

A suitable reactor equipped with a stirrer, two dropping funnels for the monomer mixture and the initiator solution, a nitrogen inlet pipe, thermometer, heating, and a reflux condenser was charged with 650 parts by weight of an aromatic hydrocarbon fraction having a boiling range of from 158 to 172° C. The solvent was heated to 140° C. Then a monomer mixture of 652 parts by weight of ethylhexyl acrylate, 383 parts by weight of 2-hydroxyethyl methacrylate, 143 parts by weight of styrene, 212 parts by weight of 4-hydroxybutyl acrylate and 21 parts by weight of acrylic acid was metered into the initial charge at a uniform rate over the course of four hours and an initiator solution of 113 parts by weight of the aromatic solvent and 113 parts by weight of tert-butyl perethylhexanoate was metered into the initial charge at a uniform rate over the course of 4.5 hours. The addition of the monomer mixture and of the initiator solution was commenced simultaneously. After the end of the initiator feed, the resulting reaction mixture was heated at 140° C. with stirring for two hours more and then cooled. The resulting solution of the methacrylate copolymer was diluted with a mixture of 1-methoxypropyl 2-acetate, butyl glycol acetate and butyl acetate.

The resulting solution had a solids content of 65% by weight, determined in a forced air oven (one hour/130° C.), an acid number of 15 mg KOH/g solids, an OH number of 175 mg KOH/g solids, and a glass transition temperature of −21° C.

Preparation Example 4

The Preparation of a Dual-cure Clearcoat Material (C)

The dual-cure clearcoat material (C) was prepared by mixing the constituents stated in table 1 and homogenizing the resulting mixture.

TABLE 1

The material composition of the dual-cure clearcoat material (C)

| Ingredient | Parts by weight: |
|---|---|
| Stock varnish: | |
| Methacrylate copolymer from preparation example 3 | 35.9 |
| Dipentaerythritol pentaacrylate | 20.0 |
| UV absorber (substituted hydroxyphenyltriazine) | 1.0 |
| HALS (N-methyl-2,2,6,6-tetramethylpiperidinyl ester) | 1.0 |
| Additive (Byk ® 358 from Byk Chemie) | 0.2 |
| Butyl acetate 98-100 | 29.4 |
| Irgacure ® 184 (commercial photoinitiator from Ciba Specialty Chemicals) | 1.0 |
| Lucirin ® TPO (commercial photoinitiator from BASF AG, based on acylphosphine oxide) | 0.5 |
| Solventnaphtha ® | 11.0 |
| Total: | 100 parts by weight |
| Crosslinking components: | |
| Crosslinking agent 1: | |
| Isocyanato acrylate Roskydal ® UA VPLS 2337 from Bayer AG (basis: trimeric hexamethylene diisocyanate; isocyanate group content: 12% by weight) | 26.02 |
| Crosslinking agent 2: | |
| Isocyanato acrylate Roskydal ® UA VP FWO 3003-77 from Bayer AG, based on the trimer of isophorone diisocyanate (70.5% in butyl acetate; viscosity: 1500 mPas; isocyanate group content: 6.7% by weight) | 6.52 |
| Butyl acetate | 3.26 |
| Total: | 35.8 parts by weight |

Examples 1 to 6 and C 1 to C 6 (C=Comparative)

The Production of Multicoat Color Paint Systems by the Inventive Process (Examples 1 to 6) and by a Noninventive Process (Examples C 1 to C 6)

Examples 2, 4, 6, $C_2$, $C_4$, and C 6 were carried out using the dual-cure primer (A 1) from preparation example 1.

Examples 1, 3, 5, $C_1$, $C_3$, and C 5 were carried out using the dual-cure primer (A 2) from preparation example 2.

Examples 1 and 2 and C 1 and C 2 were carried out using customary and known IMC substrates.

Examples 3 and 4 and C 3 and C 4 were carried out using customary and known SMC substrates.

For examples 5 and 6 and C 5 and C 6, customary and known Bonder panels (metal) were used.

For all of the examples, inventive and comparative, the dual-cure primers (A) were applied using pneumatic spray guns in a wet film thickness such that after curing primers (A) had a dry film thickness of from 25 to 27 μm.

In the case of examples 1 to 6 and C 1 to C 6, the resulting primer films (A) were exposed to UV radiation in a dose of $1.5 \times 10^4$ J m$^{-2}$, after which they were still thermally curable.

In the case of examples C 1 to C 6, the resulting primer films (A) were additionally cured thermally at 80° C. for 20 minutes, after which they were completely cured.

Atop each of the thermally curable primer films (A) of examples 1 to 6 and the fully cured primer coats (A) of examples C 1 to C 6 there was applied, pneumatically, a thermally curable, commercially customary aqueous basecoat material (B) (Nachtschwarz from BASF Coatings AG) in a wet film thickness such that, after complete curing, the basecoats (B) had a dry film thickness of from 12 to 15 μm. The applied basecoat films (B) were dried at 80° C. for ten minutes.

Applied pneumatically in one cross pass to the dried basecoat films (B) was the dual-cure clearcoat material (C) from preparation example 4. The wet film thickness was set such that, after complete curing, clearcoats (C) with a dry film thickness of from to 45 μm were obtained. The clearcoat material was dried, after a five-minute flashoff at room temperature, at 80° C. for ten minutes, exposed to UV radiation in a dose of $1.5 \times 10^4$ J m$^{-2}$, and finally cured at 90° C. for 30 minutes.

The adhesion properties of the multicoat color paint systems of the inventive and comparative examples were tested by means of the steam jet test. For this purpose, a cross was scored into each of the multicoat paint systems. The scored areas were sprayed with a water jet (Walter type LTA2 apparatus; pressure: 80 bar; water temperature: 80° C.; nozzle tip/test panel distance: 12 cm; exposure period: 30 seconds; apparatus setting: F 2).

The degree of delamination was assessed visually for examples 5 and 6 and also C 5 and C 6 (substrate: Bonder panels) and was rated as follows:

| Rating | Degree of delamination |
| --- | --- |
| 0 | none |
| 1 | minimal |
| 2 | slight to moderate |
| 3 | moderate |
| 4 | severe |
| 5 | complete |

For examples 1 and 2 and also C 1 and C 2 (substrate: IMC) and for examples 3 and 4 and also C 3 and C 4 (substrate: SMC) an assessment was made of whether the multicoat paint systems had suffered no delamination (rating: satisfactory) and whether substrate fracture had occurred.

The multicoat paint systems of examples 1 to 4 and of examples C 1 to C 4 were subjected to the cross-cut test of DIN ISO 2409: 1994-10. The spacing of the cuts was 1.5 mm.

The multicoat paint systems of examples 5 and 6 and of examples C 5 and C 6 were likewise subjected to the cross-cut test of DIN ISO 2409: 1994-10. The spacing of the cuts was 2 mm.

Additionally, the multicoat systems of examples 5 and 6 and of comparative examples C 5 and C 6 were subjected to the multiple stone chipping test according to the VDA (German automakers' association) (2*500 g steel shot). The resulting delamination was assessed and rated (rating 1: no delamination, to rating 5: very severe delamination).

The multicoat systems of examples 5 and 6 and of comparative examples C 5 and C 6 that had been subjected to the multiple stone chipping test were also subjected to the steam jet test. The resultant damage was assessed visually and rated as indicated above.

Table 2 gives an overview of the test results obtained. These test results underline the fact that, using the process of the invention, multicoat paint systems were obtained which were as good in every respect as the multicoat paint systems produced by a customary and known process, despite the fact that the process of the invention involved using one less thermal curing step than in the case of the conventional process. When the process of the invention is transferred to plant operation, this implies a sharp reduction in the process times and a saving of energy and capital.

TABLE 2

Test results

| Example | Test: Steam jet | Cross-cut 1.5 mm | 2 mm | Multiple stone chipping | +steam jet |
| --- | --- | --- | --- | --- | --- |
| C 1 | satis. | 0 | — | — | — |
| C 2 | satis. | 0 | — | — | — |
| 1 | satis. | 0 | — | — | — |
| 2 | satis. | 0 | — | — | — |
| C 3 | satis. (substrate fracture) | 0 | — | — | — |
| C 4 | satis. (substrate fracture) | 0 | — | — | — |
| 3 | satis. (substrate fracture) | 0 | — | — | — |
| 4 | Satis. (substrate fracture) | 0 | — | — | — |
| C 5 | — | — | 0 | 3 | 4 |
| C 6 | — | — | 0 | 2.5 | 3.5 |
| 5 | — | — | 0 | 3 | 3.5 |
| 6 | — | — | 0 | 3 | 3.5 |

In their optical properties (appearance) as well, the multicoat paint systems matched their conventional counterparts and were of the best automobile quality.

What is claimed is:

1. A process for producing multicoat color and/or effect paint systems comprising
   (A) at least one primer,
   (B) at least one color and/or effect basecoat, and
   (C) at least one clearcoat
   comprising
   (I) applying at least one primer (A) curable thermally and with actinic radiation to a substrate to give at least one primer film (A),
   (II) exposing the at least one primer film (A) to actinic radiation to give at least one partially cured primer film (A) which can still be thermally cured,
   (III) applying at least one pigmented coating material (B) curable thermally to the outer surface of the partially cured at least one primer film (A) to give at least one pigmented film (B) which can still be cured thermally
   (IV) applying at least one clearcoat material (C) curable with actinic radiation to the outer surface of the at least one pigmented film (B) to give at least one clearcoat film (C) curable with actinic radiation,
   (V) exposing the at least one clearcoat film (C) curable with actinic radiation to actinic radiation to give at least one clearcoat cured with actinic radiation, and
   (VI) subjecting the at least one primer film (A), and the at least one pigmented film (B), to joint thermal curing.

2. The process of claim 1, wherein the substrate comprises one of a motor vehicle body or a mounted component of a vehicle body.

3. The process of claim 2, wherein the mounted component is made of sheet molded compound (SMC), bulk molded compound (BMC), injection molded compound (IMC), or reaction injection molded compound (RIMC).

4. The process of claim 1, wherein the primer (A) comprises
   (a1) at least one constituent containing
      (a11) on average per molecule at least two functional groups containing at least one bond which can be activated with actinic radiation and which serves for crosslinking with actinic radiation, and
      (a12) optionally, at least one isocyanate-reactive group, (a2) at least one thermally curable constituent containing at least two isocyanate-reactive groups, and
(a3) at least one polyisocyanate.

5. The process of claim 4, wherein the isocyanate-reactive groups (a12) are present and are selected from the group consisting of hydroxyl, thiol, primary amino groups, secondary amino groups, imino groups, and combinations thereof.

6. The process of claim 4, wherein the functional groups (a11) are selected from the group consisting of carbon-hydrogen single bonds, carbon-carbon single bonds, carbon-oxygen single bonds, carbon-nitrogen single bonds, carbon-phosphorus single bonds, carbon-silicon single bonds, carbon-carbon double bonds, carbon-oxygen double bonds, carbon-nitrogen double bonds, carbon-phosphorus double bonds, carbon-silicon double bonds, and combinations thereof.

7. The process of claim 6, wherein the functional groups (a11) are carbon-carbon double bonds.

8. The process of claim 7, wherein the carbon-carbon double bonds are present in at least one of a (meth)acrylate group, an ethacrylate group, a crotonate group, a cinnamate group, a vinyl ether group, a vinyl ester group, an ethenylarylene group, a dicyclopentadienyl group, a norbomenyl group, an isoprenyl group, an isopropenyl group, an allyl group, a butenyl groups, an ethenylarylene ether group, a dicyclopentadienyl ether group, a norbomenyl ether group, an isoprenyl ether group, an isopropenyl ether group, an allyl ether group, a butenyl ether groups, an ethenylarylene ester group, a dicyclopentadienyl ester group, a norbomenyl ester group, an isoprenyl ester group, an isopropenyl ester group, an allyl ester group, and/or a butenyl ester group.

9. The process of claim 8, wherein the double bonds are present in acrylate groups.

10. The process of claim 4, wherein the functional groups (a12) are present and are hydroxyl groups.

11. The process of claim 4, wherein the constituents (a2) are selected from the group consisting of oligomers, polymers, and combinations thereof, wherein the oligomers and polymers are each at least one of linear, branched, block, comb, and/or random.

12. The process of claim 11, wherein the oligomers and polymers (a2) are each selected from the group consisting of (meth)acrylate (co)polymers, polyesters, alkyds, amino resins, po lyurethanes, polylactones, polycarbonates, polyethers, epoxy resin-amine adducts, (meth)acrylate diols, partially hydrolyzed polyvinyl esters, polyureas, and combinations thereof.

13. The process of claim 4, wherein a ratio of isocyanate groups to a sum of the isocyanate-reactive functional groups in the primer (A) is <1.3.

14. The process of claim 4, wherein the thermally curable constituent (a2) has a molecular weight polydispersity (mass-average molecular weight Mm/number-average molecular weight Mn) of <4.

15. The process of claim 4, wherein in the dual-cure primer (A) a ratio of solids content of constituents curable with actinic radiation (UV) to solids content of thermally curable constituents (TH), (UV)/(TH), is from 0.2 to 0.6.

16. The process of claim 4, wherein the thermally curable constituent (a2), based on its overall amount, has an aromatic structural unit content of <50% by weight.

17. The process of claim 1, wherein the at least one pigmented coating material (B) curable thermally is further curable with actinic radiation, and wherein the process further comprises exposing the at least one pigmented film (B) to actinic radiation prior to applying the at least one clearcoat material (C).

18. The process of claim 1, wherein the at least one clearcoat film (C) curable with actinic radiation is fUrther curable thermally, and wherein the process fUrther comprises subjecting the at least one clearcoat film (C) curable thermally and with actinic radiation to joint thermal curing with the at least one primer film (A), and the at least one pigmented film (B) following the exposing the at least one clearcoat film (C) to actinic radiation.

19. A process for producing multicoat color and/or effect paint systems comprising
(A) at least one primer,
(B) at least one color and/or effect basecoat, and
(C) at least one clearcoat
comprising
(I) applying at least one primer (A) curable thermally and with actinic radiation to a substrate to give at least one primer film (A),
(II) exposing the at least one primer film (A) to actinic radiation to give at least one partially cured primer film (A) which can still be thermally cured,
(III) applying at least one pigmented coating material (B) curable thermally to the outer surface of the partially cured at least one primer film (A) to give at least one pigmented film (B) which can still be cured thermally,
(IV) applying at least one clearcoat material (C) curable thermally and with actinic radiation to the outer surface of the at least one pigmented film (B) to give at least one clearcoat film (C) curable thermally and with actinic radiation,
(V) exposing the at least one clearcoat film (C) curable thermally and with actinic radiation to actinic radiation to give at least one partially cured clearcoat film (C) which can still be thermally cured, and
(VII) subjecting the at least one primer film (A), the at least one pigmented film (B), and the still thermally curable at least one clearcoat film (C) to joint thermal curing.

20. A process for producing multicoat color and/or effect paint systems comprising
(A) at least one primer,
(B) at least one color and/or effect basecoat, and
(C) at least one clearcoat
comprising
(I) applying at least one primer (A) curable thermally and with actinic radiation to a substrate to give at least one primer film (A),
(II) exposing the at least one primer film (A) to actinic radiation to give at least one partially cured primer film (A) which can still be thermally cured,
(III) applying at least one pigmented coating material (B) curable thermally and with actinic radiation to the outer surface of the partially cured at least one primer film (A) to give at least one pigmented film (B) which can still be cured both thermally and with actinic radiation,
(IV) exposing the at least one pigmented film (B) curable thermally and with actinic radiation to actinic radiation to give at least one partially cured film (B) which can still be thermally cured,
(V) applying at least one clearcoat material (C) curable thermally and with actinic radiation to the outer surface of the at least one partially cured film (B) to give at least one clearcoat film (C) curable thermally and with actinic radiation,
(VI) exposing the at least one clearcoat film (C) curable thermally and with actinic radiation to actinic radiation to give at least one partially cured clearcoat film (C) which can still be thermally cured, and
(VII) subjecting the at least one primer film (A), the at least one pigmented film (B), and the still thermally curable at least one clearcoat film (C) to joint thermal curing.

* * * * *